United States Patent [19]

Tenney

[11] Patent Number: 5,895,638
[45] Date of Patent: Apr. 20, 1999

[54] METHOD OF PRODUCING CHLORINE DIOXIDE

[75] Inventor: Joel Tenney, Marietta, Ga.

[73] Assignee: Akzo Nobel N.V., Arnhem, Netherlands

[21] Appl. No.: 08/821,164

[22] Filed: Mar. 20, 1997

[51] Int. Cl.$^6$ .................................................. C01B 11/02
[52] U.S. Cl. ............................................ 423/478; 423/477
[58] Field of Search ................................ 423/478, 479, 423/477

[56] References Cited

U.S. PATENT DOCUMENTS

| | | | |
|---|---|---|---|
| 2,332,181 | 10/1943 | Soule | 423/478 |
| 3,864,457 | 2/1975 | Hoekje et al. | 423/478 |
| 4,366,120 | 12/1982 | Cowley | 422/106 |
| 5,091,166 | 2/1992 | Engström et al. | 423/478 |
| 5,091,167 | 2/1992 | Engström et al. | 423/478 |
| 5,376,350 | 12/1994 | Tenney et al. | 423/478 |

FOREIGN PATENT DOCUMENTS

| | | |
|---|---|---|
| 04445493 | 9/1991 | European Pat. Off. . |
| 0612686 | 8/1994 | European Pat. Off. . |

*Primary Examiner*—Ngoc-Yen Nguyen
*Attorney, Agent, or Firm*—McDermott, Will & Emery

[57] ABSTRACT

The invention relates to a process of producing chlorine dioxide by the reduction of chlorate ions with hydrogen peroxide as a reducing agent in a tubular reactor, preferably in the presence of a mineral acid, wherein the preferable degree of chlorate conversion in the reactor is above about 75%, preferably from about 80 to 100%.

15 Claims, No Drawings

METHOD OF PRODUCING CHLORINE DIOXIDE

FIELD OF THE INVENTION

The present invention relates to a method of producing chlorine dioxide by the reduction of chlorate ions with hydrogen peroxide as a reducing agent in a tubular reactor.

BACKGROUND OF THE INVENTION

Chlorine dioxide is primarily used in pulp bleaching, but there is a growing interest of using it also in other applications such as water purification, fat bleaching or removal of phenol from industrial wastes. Since chlorine dioxide is not storage stable it must be produced on-site.

Production of chlorine dioxide in large scale is usually performed by reacting alkali metal chlorate or chloric acid with a reducing agent such as chloride ions, methanol or hydrogen peroxide at subatmospheric pressure, as described in, for example, EP patent 445493, U.S. Pat. Nos. 5,091,166 and 5,091,167. These production methods are highly efficient but are only suitable for production in large scale, for example at pulp mills consuming considerable amounts of chlorine dioxide for bleaching. In small scale applications, for example water purification, the chlorine dioxide is generally produced by reacting sodium chlorite with an acid.

EP patent 612686 disclose production of chlorine dioxide from alkali metal chlorate and hydrogen peroxide at substantially atmospheric pressure.

U.S. Pat. No. 5,376,350 discloses a method of producing chlorine dioxide from chlorate ions and a reducing agent in a plug flow reactor which is suitable for production in small scale. Although the method works well it is still desirable to further improve the efficiency.

SUMMARY OF THE INVENTION

It is an object of the invention to provide an improved process suitable for small scale production of chlorine dioxide from metal chlorate or chloric acid and a reducing agent. Particularly, it is an object to provide a process involving a high production rate of chlorine dioxide and low consumption of chemicals in a reactor with low space requirements. These objects are achieved by a process of producing chlorine dioxide by the reduction of chlorate ions with hydrogen peroxide as a reducing agent in a tubular reactor, preferably in the presence of a mineral acid, most preferably sulfuric acid, wherein the preferable degree of chlorate conversion in the reactor is above about 75%, preferably from about 80 to 100%, most preferably from about 95 to 100%.

DETAILED DESCRIPTION OF PREFERRED EMBODIMENTS

According to one aspect of the invention the process comprises the steps of:

(a) feeding hydrogen peroxide and a metal chlorate or chloric acid or a mixture thereof and optionally a mineral acid at one end of a tubular reactor to form a reaction mixture;

(b) reducing chlorate ions in the reaction mixture to in said tubular reactor to form chlorine dioxide, wherein the degree of chlorate conversion in said reactor is from about 75% to 100%; and (c) recovering a product containing chlorine dioxide at the other end of said tubular reactor.

According to another aspect of the invention the process comprises the steps of:

(a) feeding hydrogen peroxide and a metal chlorate or chloric acid or a mixture thereof and optionally a mineral acid at one end of a tubular reactor to form a reaction mixture, wherein the molar ratio $H_2O_2:ClO_3^-$ in the feed is from about 0.5:1 to about 2:1, preferably from about 0.5:1 to about 1:1;

(b) reducing chlorate ions in the reaction mixture to in said tubular reactor to form chlorine dioxide; and (c) recovering a product containing chlorine dioxide at the other end of said tubular reactor.

In step (a) it is particularly preferred to feed hydrogen peroxide, a metal chlorate, preferably alkali metal chlorate such as sodium chlorate, and a mineral acid, preferably sulfuric acid. In order to achieve a high degree of chlorate conversion it is normally advisable to feed hydrogen peroxide in an amount exceeding the stochiometric amount which is 0.5 mols $H_2O_2$ per mol $ClO_3^-$. However, it has surprisingly been found that too much of hydrogen peroxide has a negative impact on the chlorate conversion.

According to another aspect of the invention the process comprises the steps of:

(a) feeding hydrogen peroxide, a metal chlorate, preferably alkali metal chlorate such as sodium chlorate, and sulfuric acid at one end of the tubular reactor to form a reaction mixture, wherein the sulfuric acid feed has a concentration from about 70 to about 96 wt %, preferably from about 75 to about 85 wt % and preferably a temperature from about 0 to about 100° C., most preferably from about 20 to about 50° C.;

(b) reducing chlorate ions in the reaction mixture to in said tubular reactor to form chlorine dioxide; and (c) recovering a product containing chlorine dioxide at the other end of said tubular reactor.

It has been found that if the sulfuric acid feed has a concentration within the specified range, no external heating or cooling is needed as the energy from the dilution is sufficient for operating the reactor adiabatically. It has also been found that the specified temperature range facilitates stable operation of the process.

According to still another aspect of the invention the process comprises the steps of:

(a) feeding hydrogen peroxide, a metal chlorate, preferably alkali metal chlorate such as sodium chlorate, and sulfuric acid at one end of the tubular reactor to form a reaction mixture;

(b) reducing chlorate ions in the reaction mixture to in said tubular reactor to form chlorine dioxide; and (c) recovering a product containing chlorine dioxide at the other end of said tubular reactor, wherein from about 2 to about 10 kg $H_2SO_4$, preferably from about 3 to about 5 kg $H_2SO_4$ is fed per kg $ClO_2$ produced.

It has surprisingly been found that is possible to operate at a chlorate conversion degree above about 75% in spite of the comparatively low amount of sulfuric acid fed.

According to a particularly preferred embodiment the invention concerns a process of producing chlorine dioxide by the reduction of chlorate ions with hydrogen peroxide as a reducing agent in a tubular reactor comprising the steps of:

(a) feeding hydrogen peroxide, a metal chlorate, preferably alkali metal chlorate such as sodium chlorate, and sulfuric acid at one end of the tubular reactor to form a reaction mixture, wherein the molar ratio $H_2O_2:ClO_3^-$ is from about 0.5:1 to about 2:1, preferably from about 0.5:1 to about 1:1, and wherein the sulfuric acid feed has a concentration from about 70 to about 96 wt %, preferably from about 75 to about 85 wt % and preferably a temperature from about 0 to about 100° C., most preferably from about 20 to about 50° C.;

(b) reducing chlorate ions in the reaction mixture to in said tubular reactor to from chlorine dioxide; and (c) recovering a product containing chlorine dioxide at the other end of said tubular reactor, wherein from about 2 to about 10 kg $H_2SO_4$, preferably from about 3 to about 5 kg $H_2SO_4$ is fed per kg $ClO_2$ produced.

Features that are particularly preferred in all the aspects and embodiments of the invention will now be described.

The product recovered contains chlorine dioxide, oxygen and optionally a metal salt of the mineral acid. Normally it also contains unreacted chemicals such as mineral acid and small amounts of chlorate ions. However, it has been found possible to avoid any substantial formation of chlorine.

It is preferred to operate without recirculation of unreacted chemicals such as chlorate or sulfuric acid. In many applications the complete product mixture can be used without separation, for example in water purification. Another option is to separate the gaseous product, i.e. chlorine dioxide and oxygen and use the chlorate containing liquid as a feed in another chlorine dioxide generator, for example in processes as described in the earlier mentioned EP patent 445493, U.S. Pat. Nos. 5,091,166 and 5,091,167.

Although an ideal tubular reactor normally is operated with a plug flow without any backmixing, it has been found that the process of the invention is highly effective even if it is operated without any substantial concentration gradients in the reactor.

The reaction mixture in the bulk of the reactor preferably contains from 0 to about 2, most preferably from 0 to about 0.1 moles per liter of chlorate ions, and from about 3 to about 10, most preferably from about 4 to about 6 moles per liter of sulfuric acid. It is preferred to maintain the concentration of chlorate and sulfate below saturation to avoid crystallization of metal salts thereof.

All the chemical feeds, i.e. hydrogen peroxide, metal chlorate or chloric acid and the mineral acid are preferably supplied as aqueous solutions. It has been found that too much water in the system increases the energy consumption and decreases the chemical efficiency, while to little water results in loss of stability. Therefore, the hydrogen peroxide feed solution preferably has concentration from about 30 to about 70 wt %, most preferably from about 40 to about 60 wt %. The chlorate feed solution, preferably alkali metal chlorate such as sodium chlorate, suitably has a concentration from about 0.5 moles per liter to saturation, preferably from about 3 to about 6 moles per liter, most preferably from about 4.5 to about 5.5 moles per liter. The mineral acid feed, preferably sulfuric acid, preferably has concentration from about 50 to about 96 wt %, most preferably from about 75 to about 85 wt %. It is preferred not to add chloride ions except the chloride always present as an impurity in the chlorate feed. Preferably conventional alkali metal chlorate without extra added chloride is used which normally contains less than about 0.5, often less than about 0.05, preferably less than about 0.02, most preferably less than about 0.01 wt % of alkali metal chloride.

It has been found that the chemical efficiency is improved by a high operating pressure, although too high a pressure result in such a high chlorine dioxide partial pressure that safety problems might occur. Suitably the pressure in the reactor is from about 125 to about 900 mm Hg, preferably from about 350 to about 760 mm Hg, most preferably from about 500 to about 650 mm Hg. The chlorine dioxide partial pressure is further decreased by oxygen and/or steam formed in the reactor. Although normally not necessary, it is possible also to supply extra inert gas such as air. The temperature is preferably maintained from about 30° C. to the boiling point of the reaction mixture, most preferably at about the boiling point.

It has been found that the degree of mixing of the reactants affects the efficiency and it is preferred that the chlorate feed is substantially uniformly dispersed in the mineral acid at the inlet of the reactor to avoid any substantial radial concentration gradients over the cross section of the reactor. It is also preferred that the chlorate feed is mixed with the hydrogen peroxide prior to being dispersed into the mineral acid. In order to minimize the radial concentration gradients it has been found favourable to use a tubular reactor with a inner diameter from about 25 to about 250 mm, preferably from about 70 to about 130 mm. It is preferred that the process is operated without any substantial concentration gradients in the tubular reactor.

It has surprisingly been found possible to achieve a very high chlorine dioxide production rate, preferably from about 0.2 to about 7 kg/hr, most preferably from about 0.45 to about 4.5 kg/hr, and a high degree of chlorate conversion in a comparatively short tubular reactor preferably having a length from about 50 to about 500 mm, most preferably from about 100 to about 300 mm. It has also been found favourable to use a tubular reactor having a ratio of the length to the inner diameter from about 12:1 to about 1:1, most preferably from about 3:1 to about 1.5:1. A suitable average residence time in the reactor is from about 1 to about 100 minutes, preferably from about 4 to about 40 minutes.

A small scale production plant normally consist of only one tubular reactor, but it is possible to arrange several, for example up to about 10 tubular reactors in parallel, for example as a bundle of tubes.

The invention will now be further described in connection with the following examples which, however, not are intended to be interpreted to limit the scope of the invention.

EXAMPLE 1

A process according to the invention was performed by continuously feeding a tubular reactor having an internal diameter of 100 mm and a length of 300 mm with 45 ml/min. of aqueous 5 M sodium chlorate, 46 ml/min. of 78 wt % sulfuric acid and 10 ml/min of 50 wt % hydrogen peroxide. The reactor was operated at a pressure of 630 mm Hg and a temperature of 50° C. Experiments performed at different molar ratios $H_2O_2$ to $NaClO_3$ showed that the chlorate conversion degree was affected significantly as appears in the table below:

| molar ratio $H_2O_2$:$NaClO_3$ | kg $H_2O_2$ per kg $ClO_2$ | $ClO_2$ prod. rate (kg/h) | $ClO_3^-$ conversion degree (%) |
|---|---|---|---|
| 0.75 | 0.38 | 0.91 | 98 |
| 0.76 | 0.38 | 0.91 | 99 |
| 0.78 | 0.38 | 0.91 | 100 |
| 0.82 | 0.39 | 0.86 | 97 |
| 1.19 | 0.95 | 0.91 | 63 |
| 2.40 | 1.70 | 0.86 | 70 |

EXAMPLE 2

A process was performed in two different tubular reactors having the length of 300 mm. The inner diameters of the reactors were 100 and 150 mm, respectively. The reactors were continuously fed with aqueous 5 M sodium chlorate, 78 wt % sulfuric acid and 50 wt % hydrogen peroxide. The reactors were operated at a pressure of 630 mm Hg and a temperature of 60° C. It was found that the size of the reactor affected the chlorate conversion degree as shown in the table below:

| Reactor diameter (mm) | kg $H_2O_2$ per per kg $ClO_2$ | $ClO_2$ prod. rate (kg/h) | $ClO_3^-$ conversion degree (%) |
|---|---|---|---|
| 150 | 5.97 | 0.91 | 83 |
| 150 | 7.14 | 3.75 | 84 |
| 100 | 5.36 | 2.70 | 93 |
| 100 | 4.60 | 0.87 | 97 |

EXAMPLE 3

A process was performed by continuously feeding a tubular reactor havng an internal diameter of 100 mm and a length of 300 mm with aqueous 5 M sodium chlorate, 78 wt % sulfuric acid and 50 wt % hydrogen peroxide. The reactor was operated at a pressure of 630 mm Hg and a temperature of 60° C. The amount of sulfuric acid fed was varied to achieve different compositions of the reaction mixture in the reactor. The results are shown in the table below:

| [$H_2SO_4$] (M) | [$NaClO_2$] (M) | $NaClO_3$ (ml/min.) | $H_2SO_4$ (ml/min.) | $H_2O_2$ (ml/min) | $ClO_2$ prod. rate (kg/h) | $ClO_3^-$ conversion degree (%) |
|---|---|---|---|---|---|---|
| 4.59 | 0.040 | 22.7 | 20.4 | 5.1 | 0.45 | 100 |
| 4.77 | 0.000 | 22.7 | 20.4 | 5.1 | 0.45 | 98 |
| 5.20 | 0.003 | 22.7 | 20.4 | 5.1 | 0.45 | 100 |
| 5.59 | 0.140 | 113.7 | 130.0 | 25.5 | 2.27 | 94 |
| 5.37 | 0.120 | 113.7 | 130.0 | 25.5 | 2.27 | 94 |
| 6.25 | 0.045 | 113.7 | 130.0 | 25.5 | 2.13 | 97 |
| 6.30 | 0.065 | 113.7 | 130.0 | 25.5 | 2.18 | 96 |

I claim:

1. A process of producing chlorine dioxide by the reduction of chlorate ions in the presence of a mineral acid or chloric acid with hydrogen peroxide as a reducing agent in a tubular reactor comprising the steps of:

(a) feeding hydrogen peroxide, a metal chlorate and a mineral acid or chloric acid or a mixture thereof at one end of a tubular reactor to form a reaction mixture, wherein the molar ratio $H_2O_2:ClO_3^-$ in the feed is from about 0.5:1 to about 2:1;

(b) reducing chlorate ions in the reaction mixture in said tubular reactor to form chlorine dioxide; and (c) recovering a product containing chlorine dioxide at the other end of said tubular reactor.

2. Process as claimed in claim 1, wherein step (a) includes feeding a metal chlorate and a mineral acid.

3. Process as claimed in claim 1, wherein no unreacted chlorate or mineral acid are recirculated.

4. Process as claimed in claim 1, wherein the inner diameter of the tubular reactor is from about 25 to about 250 mm.

5. Process as claimed in claim 1, wherein the tubular reactor has a ratio of the length to the inner diameter from below 12:1 to about 1:1.

6. Process as claimed in claim 1, wherein the pressure in the tubular reactor is from about 125 to about 900 mm Hg.

7. Process as claimed in claim 1, wherein the reaction mixture in the bulk of the reactor contains from 0 to about 2 moles per liter of chlorate ions and from about 3 to about 10 moles per liter of sulfuric acid.

8. Process as claimed in claim 7, wherein the reaction mixture in the bulk of the reactor contains from 0 to about 0.1 moles per liter of chlorate ions.

9. Process as claimed in claim 1, wherein it is operated without any substantial concentration gradients in the tubular reactor.

10. A process as claimed in claim 2, wherein the metal chlorate is alkali metal chlorate.

11. A process as claimed in claim 2, wherein the mineral acid is sulfuric acid.

12. A process as claimed in claim 11, wherein from about 3 to about 5 kg $H_2SO_4$ is fed per kg $ClO_2$ produced.

13. A process as claimed in claim 12, wherein the sulfuric acid feed has a temperature from about 20 to about 50° C.

14. A process as claimed in claim 1, wherein the molar ratio $H_2O_2:ClO_3$ in the feed is from about 0.5:1 to about 1:1.

15. A process of producing chlorine dioxide by the reduction of chlorate ions with hydrogen peroxide as a reducing agent in the presence of sulfuric acid in a tubular reactor comprising the steps of:

(a) feeding hydrogen peroxide, a metal chlorate and sulfuric acid at one end of the tubular reactor to form a reaction mixture, wherein the molar ratio $H_2O_2:ClO_3^-$ is from about 0.5:1 to about 2:1, and wherein the sulfuric acid feed has a concentration from about 70 to about 96 wt %;

(b) reducing chlorate ions in the reaction mixture in said tubular reactor to form chlorine dioxide; and (c) recovering a product containing chlorine dioxide at the other end of said tubular reactor, wherein from about 2 to about 10 kg $H_2SO_4$ is fed per kg $ClO_2$ produced.

* * * * *

(12) REEXAMINATION CERTIFICATE (4711st)
United States Patent
Tenney

(10) Number: US 5,895,638 C1
(45) Certificate Issued: Jan. 7, 2003

(54) METHOD OF PRODUCING CHLORINE DIOXIDE

(75) Inventor: Joel Tenney, Marietta, GA (US)

(73) Assignee: Akop Nobel N.V., Arnhem (NL)

Reexamination Request:
No. 90/005,978, Apr. 12, 2001
No. 90/005,999, May 9, 2001

Reexamination Certificate for:
Patent No.: 5,895,638
Issued: Apr. 20, 1999
Appl. No.: 08/821,164
Filed: Mar. 20, 1997

(51) Int. Cl.⁷ .............................................. C01B 11/02
(52) U.S. Cl. ...................................... 423/478; 423/477
(58) Field of Search ................................ 423/477, 478, 423/479

(56) References Cited

U.S. PATENT DOCUMENTS

| | | | | |
|---|---|---|---|---|
| 2,833,624 A | * | 5/1958 | Sprauer | 423/478 |
| 4,534,952 A | * | 8/1985 | Rapson et al. | 210/753 |
| 5,091,166 A | * | 2/1992 | Engstrom et al. | 162/6 |
| 5,091,167 A | * | 2/1992 | Engstrom et al. | 162/6 |
| 5,376,350 A | * | 12/1994 | Tenney et al. | 423/478 |
| 5,380,517 A | * | 1/1995 | Sokol | 252/187.21 |

\* cited by examiner

*Primary Examiner*—Steven Bos

(57) ABSTRACT

The invention relates to a process of producing chlorine dioxide by the reduction of chlorate ions with hydrogen peroxide as a reducing agent in a tubular reactor, perferably in the presence of a mineral acid, wherein the preferable degree of chlorate conversion in the reactor is above about 75%, preferably from about 80 to 100%.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2,10 and 11 are cancelled.

Claims 3–7, 9, 12, 14 and 15 are determined to be patentable as amended.

Claims 8 and 13, dependent on an amended claim, are determined to be patentable.

3. Process as claimed in claim [1] *15*, wherein no unreacted chlorate or [mineral] *sulfuric* acid are recirculated.

4. Process as claimed in claim [1] *15*, wherein the inner diameter of the tubular reactor is from about 25 to about 250 mm.

5. Process as claimed in claim [1] *15*, wherein the tubular reactor has a ratio of the length to the inner diameter from below 12:1 to about 1:1.

6. Process as claimed in claim [1] *15*, wherein the pressure in the tubular reactor is from about 125 to about 900 mm Hg.

7. Process as claimed in claim [1] *15*, wherein the reaction mixture in the bulk of the reactor contains from 0 to about 2 moles per liter of chlorate ions and from about 3 to about 10 moles per liter of sulfuric acid.

9. Process as claimed in claim [1] *15*, wherein it is operated without any substantial concentration gradients in the tubular reactor.

12. A process as claimed in claim [11] *15*, wherein from about 3 to about 5 kg $H_2SO_4$ is fed per kg $ClO_2$ produced.

14. A process as claimed in claim [1] *15*, wherein the molar ratio $H_2O_2:ClO_3$ in the feed is from about 0.5:1 to about 1:1.

15. A process of producing chlorine dioxide by the reduction of chlorate ions with hydrogen peroxide as a reducing agent in the presence of sulfuric acid in a tubular reactor comprising the steps of:

(a) feeding hydrogen peroxide, [a] *an alkali* metal chlorate and sulfuric acid at one end of a tubular reactor to form a reaction mixture, wherein the molar ratio $H_2O_2:ClO_3^-$ is from about 0.5:1 to about 2:1, *and wherein the alkali metal chlorate has less than about 0.5 wt % of alkali metal chloride* and wherein the sulfuric acid feed has a concentration from about 70 to about 96 wt %;

(b) reducing chlorate ions in the reaction mixture in said tubular reactor to form chlorine dioxide; and (c) recovering a product containing chlorine dioxide at the other end of said tubular reactor, wherein from about 2 to about 10 kg $H_2SO_4$ is fed per kg $ClO_2$ produced.

* * * * *